Nov. 28, 1933.  H. M. KING  1,937,153
RING FOR MARKING BIRDS AND ANIMALS
Filed Feb. 13, 1933
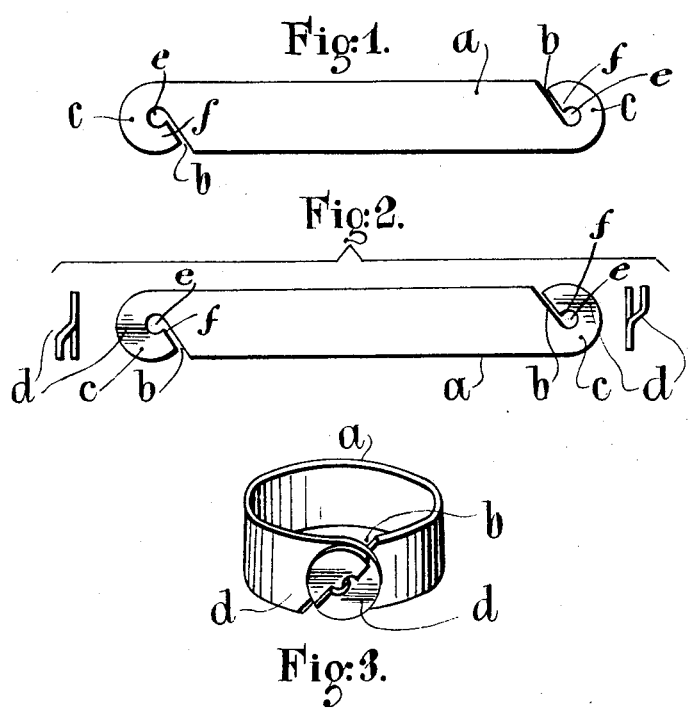
Inventor
HENDRIC MAURICE KING,
Attorneys Patented Nov. 28, 1933

1,937,153

UNITED STATES PATENT OFFICE 1,937,153

RING FOR MARKING BIRDS AND ANIMALS

Hendric Maurice King, Grimsby, England

Application February 13, 1933, Serial No. 656,403, and in Great Britain December 6, 1932

3 Claims. (Cl. 40—3)

This invention relates to rings adapted to be placed on the limb of a bird or animal for the purpose of identification.

A ring for birds or animals made in accordance with this invention is formed from a strip of resilient material of suitable width and length and having a transversely inclined slot near each end thereof, each slot extending substantially halfway across the strip in the direction of its width, whereby the two opposite ends of the strip are adapted to overlap and interlock when the strip is bent in the form of a ring. Each outer end of the strip is so formed as to define with the slots two oppositely disposed loops or hooks adapted to overlap and interlock when the strip is bent in the form of a ring.

In the drawing filed herewith:—

Fig. 1 is a view of a strip adapted to be bent to form a ring when in position on a bird or animal;

Fig. 2 shows a modification of the arrangement in Figure 1, and includes two end views;

Fig. 3 is a perspective view of a ring made from the strip shown in Fig. 2.

In the drawing, the strip $a$ of resilient or other material is provided with an inclined slot $b$ at each end, forming loops or hooks $c$ which are adapted to interlock when the strip is bent in the form of a ring; the inner end of each slot is enlarged as shown on the drawing. The partial circle defining each enlargement $e$ should extend approximately through three quarters of the circumference of the said circle. The inner edge of each slot is tangential to the circular edge of its enlargement, the outer edge of each slot forming with the partial circle a sharp corner $f$ which acts as a catch with the corresponding corner on the opposite end of the strip, to lock the two loops or hooks together and thus prevent their accidental withdrawal when the strip is bent in the form of a ring and the loops or hooks are in engagement.

In actual practice I have found that the partially circular enlargement is best constituted by three quarters the circumference of the circle. The width of the slot is approximately equal to the thickness of the strip.

In the modification shown in Figs. 2 and 3, the loops or hooks $c$ are shaped with a shoulder $d$ as shown so that when the two loops are interlocked they lie snugly to the ring.

Finger pressure is needed to close the ring and engage the slots, and when the pressure is released the diagonal slots bring the two ends into alignment and engage the two loops.

The diagonal slots and loops make the ring difficult to remove without the use of both hands because the diagonal slots $b$ and catches $f$ tend to make the edges of the loops catch unless pressure is used in two directions; i. e., firstly to squeeze the ring and secondly to keep the ring in alignment.

The ring may be made in any size and color to suit the limbs of the birds or animals.

What I claim and desire to secure by Letters Patent is:—

1. A marking ring for birds and animals formed from a strip of resilient material of suitable width and length, and having a transversely inclined slot near each end thereof, each slot extending substantially half-way across the strip in the direction of its width, each outer end of the strip being so formed as to define with the slots two oppositely disposed hooks adapted to overlap and interlock when the strip is bent in the form of a ring, and a shoulder on the hook associated with each slot.

2. A marking ring for birds and animals formed from a strip of resilient material of suitable width and length, and having a transversely inclined slot near each end thereof, each slot extending substantially half way across the strip in the direction of its width and being formed with a partially circular enlargement at its inner end, and wherein the inner edge of each slot is tangential to the circular edge of its enlargement, the outer edge of the slot forming with the circle a sharp corner, whereby the slots and their enlargements together with the outer ends of the strip define two oppositely disposed hooks adapted to overlap and interlock when the strip is bent in the form of a ring, the sharp corner of the slot acting as a catch to assist in preventing the accidental opening of the ring when closed.

3. A marking ring for birds and animals formed from a strip of resilient material of suitable width and length, and having a transversely inclined slot near each end thereof, each slot extending substantially half way across the strip in the direction of its width and being formed with an enlargement at its inner end, the said enlargement being constituted by substantially three quarters the circumference of a circle, and wherein the inner edge of each slot is tangential to the circular edge of its enlargement, the outer edge of the slot forming with the circle a sharp corner, whereby the slots and their enlargements together with the outer ends of the strip define two oppositely disposed hooks adapted to overlap and interlock when the strip is bent in the form of a ring, the sharp corner of the slot acting as a catch to assist in preventing the accidental opening of the ring when closed.

HENDRIC MAURICE KING.